(12) United States Patent
Goleski et al.

(10) Patent No.: US 9,435,404 B2
(45) Date of Patent: Sep. 6, 2016

(54) MULTIPLE SPEED TRANSMISSION

(75) Inventors: Gregory Daniel Goleski, Rochester Hills, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 830 days.

(21) Appl. No.: 13/569,462

(22) Filed: Aug. 8, 2012

(65) Prior Publication Data

US 2014/0045640 A1 Feb. 13, 2014

(51) Int. Cl.
*F16H 3/66* (2006.01)

(52) U.S. Cl.
CPC ......... *F16H 3/66* (2013.01); *F16H 2200/0065* (2013.01); *F16H 2200/2012* (2013.01); *F16H 2200/2046* (2013.01); *F16H 2200/2082* (2013.01); *F16H 2200/2097* (2013.01)

(58) Field of Classification Search
CPC ............... F16H 2200/2012; F16H 2200/0065; F16H 2200/2082; F16H 2200/2046; F16H 3/58; F16H 3/66
USPC .......................................... 477/174; 475/277
See application file for complete search history.

(56) References Cited

U.S. PATENT DOCUMENTS

| | | |
|---|---|---|
| 3,190,147 A | 6/1965 | Livingston |
| 4,420,992 A | 12/1983 | Windish |
| 4,683,776 A | 8/1987 | Klemen |
| 4,788,887 A | 12/1988 | Lepelletier |
| 6,176,803 B1 | 1/2001 | Meyer et al. |
| 6,955,627 B2 | 10/2005 | Thomas et al. |
| 6,960,149 B2 | 11/2005 | Ziemer |
| 7,163,484 B2 | 1/2007 | Klemen |
| 7,276,011 B2 | 10/2007 | Tobata et al. |
| 7,556,582 B2 | 7/2009 | Gumpoltsberger |

(Continued)

FOREIGN PATENT DOCUMENTS

WO 2011020897 A1 2/2011
WO WO2011/020894 * 2/2011 .................... 475/276

OTHER PUBLICATIONS

H. Benford, M. Leising, The Lever Analogy: A New Tool in Transmission Analysis, 1982, Society of Automotive Engineers, Inc. 810102, p. 429-437.

*Primary Examiner* — Robert Hodge
*Assistant Examiner* — Stacey Fluhart
(74) *Attorney, Agent, or Firm* — James Dottavio; Brooks Kushman P.C.

(57) ABSTRACT

A family of transmission gearing arrangements produces nine forward and one reverse speed ratio by selective engagement of various combinations of three clutches or brakes. Each transmission gearing arrangement includes a front shiftable gearing arrangement configured to establish a variety of speed ratios between an intermediate shaft and an input shaft. These speed ratios include a reverse speed ratio, a zero speed ratio, two underdrive ratios, and a direct ratio. Each transmission also includes a rear shiftable gearing arrangement configured to selectively establish particular speed relationships among the input shaft, the intermediate shaft, and an output shaft. Engagement of a clutch in the rear shiftable gearing arrangement establishes an underdrive ratio between the output shaft and the intermediate shaft. Engagement of another clutch in the rear shiftable gearing arrangement constrains the speed of the input shaft to be a weighted average between the speed of the intermediate shaft and the output shaft.

26 Claims, 8 Drawing Sheets

(56) References Cited

U.S. PATENT DOCUMENTS

| | | |
|---|---|---|
| 7,635,315 B2 | 12/2009 | Kamm et al. |
| 7,878,941 B2 | 2/2011 | Hukill et al. |
| 7,985,160 B2 | 7/2011 | Jang et al. |
| 7,998,013 B2 | 8/2011 | Phillips et al. |
| 8,016,708 B2 | 9/2011 | Diosi et al. |
| 8,052,566 B2 | 11/2011 | Wittkopp et al. |
| 8,052,567 B2 | 11/2011 | Hart et al. |
| 8,113,984 B2 | 2/2012 | Wittkopp et al. |
| 8,177,674 B2 | 5/2012 | Baldwin |
| 8,187,139 B2 | 5/2012 | Baldwin |
| 8,210,982 B2 | 7/2012 | Gumpoltsberger et al. |
| 8,231,495 B2 | 7/2012 | Gumpoltsberger et al. |
| 8,231,501 B2 | 7/2012 | Gumpoltsberger et al. |
| 8,241,171 B2 | 8/2012 | Gumpoltsberger et al. |
| 8,246,504 B2 | 8/2012 | Gumpoltsberger et al. |
| 8,251,859 B2 | 8/2012 | Gumpoltsberger et al. |
| 8,287,420 B2 | 10/2012 | Gumpoltsberger et al. |
| 8,303,455 B2 | 11/2012 | Gumpoltsberger et al. |
| 8,398,522 B2 | 3/2013 | Bauknecht et al. |
| 8,403,803 B2 | 3/2013 | Gumpoltsberger et al. |
| 8,425,370 B2 | 4/2013 | Leesch et al. |
| 8,496,556 B2 | 7/2013 | Wittkopp et al. |
| 2005/0202922 A1* | 9/2005 | Thomas ............ F16H 3/66 475/269 |
| 2008/0108473 A1 | 5/2008 | Shim |
| 2010/0035718 A1 | 2/2010 | Saitoh |
| 2010/0210403 A1* | 8/2010 | Wittkopp et al. .......... 475/275 |
| 2010/0210405 A1 | 8/2010 | Phillips et al. |
| 2011/0009228 A1 | 1/2011 | Bauknecht et al. |
| 2011/0009229 A1 | 1/2011 | Bauknecht et al. |
| 2011/0045936 A1 | 2/2011 | Gumpoltsberger et al. |
| 2011/0045937 A1 | 2/2011 | Gumpoltsberger et al. |
| 2011/0045938 A1 | 2/2011 | Gumpoltsberger et al. |
| 2011/0045939 A1 | 2/2011 | Gumpoltsberger et al. |
| 2011/0045940 A1 | 2/2011 | Gumpoltsberger et al. |
| 2011/0045941 A1 | 2/2011 | Gumpoltsberger et al. |
| 2011/0045942 A1 | 2/2011 | Gumpoltsberger et al. |
| 2011/0045943 A1 | 2/2011 | Gumpoltsberger et al. |
| 2011/0207575 A1* | 8/2011 | Kraynev ............ F16H 3/663 475/297 |
| 2011/0300983 A1 | 12/2011 | Kurokawa |
| 2012/0071289 A1* | 3/2012 | Wittkopp et al. ............ 475/275 |
| 2012/0100952 A1 | 4/2012 | Wittkopp et al. |
| 2012/0115671 A1 | 5/2012 | Gumpoltsberger et al. |
| 2012/0115672 A1* | 5/2012 | Gumpoltsberger et al. .. 475/276 |
| 2012/0122626 A1 | 5/2012 | Gumpoltsberger et al. |
| 2012/0135834 A1 | 5/2012 | Gumpoltsberger et al. |
| 2012/0135835 A1 | 5/2012 | Gumpoltsberger et al. |
| 2012/0142486 A1 | 6/2012 | Gumpoltsberger et al. |
| 2012/0149526 A1 | 6/2012 | Gumpoltsberger et al. |
| 2012/0157259 A1 | 6/2012 | Phillips |
| 2012/0165153 A1 | 6/2012 | Borgerson et al. |
| 2012/0165154 A1 | 6/2012 | Wittkopp et al. |
| 2012/0172173 A1 | 7/2012 | Wittkopp et al. |
| 2013/0196813 A1 | 8/2013 | Oita et al. |
| 2013/0196814 A1 | 8/2013 | Gumpoltsberger et al. |
| 2013/0274059 A1 | 10/2013 | Beck et al. |
| 2014/0045639 A1 | 2/2014 | Goleski |
| 2014/0051542 A1 | 2/2014 | Baek |
| 2014/0087910 A1 | 3/2014 | Thomas et al. |

\* cited by examiner

MULTIPLE SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

A family of transmission gearing arrangements is disclosed. Each transmission gearing arrangement includes a front shiftable gearing arrangement configured to establish a variety of speed ratios between an intermediate shaft and an input shaft, including a reverse speed ratio, a zero speed ratio, two underdrive speed ratios, and a direct drive ratio. The front shiftable gearing arrangement can, for example, comprise two simple planetary gear sets and four clutches. Each transmission gearing arrangement also includes a rear shiftable gearing arrangement configured to selectively establish particular speed relationships among the input shaft, the intermediate shaft, and an output shaft. The rear shiftable gearing arrangement can, for example, comprise two simple planetary gear sets and two clutches. Engaging the clutches in various combinations of three establishes nine forward speed ratios and one reverse speed ratio.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake. A group of elements are coupled if they are fixedly coupled or selectively coupled.

Figure 1:
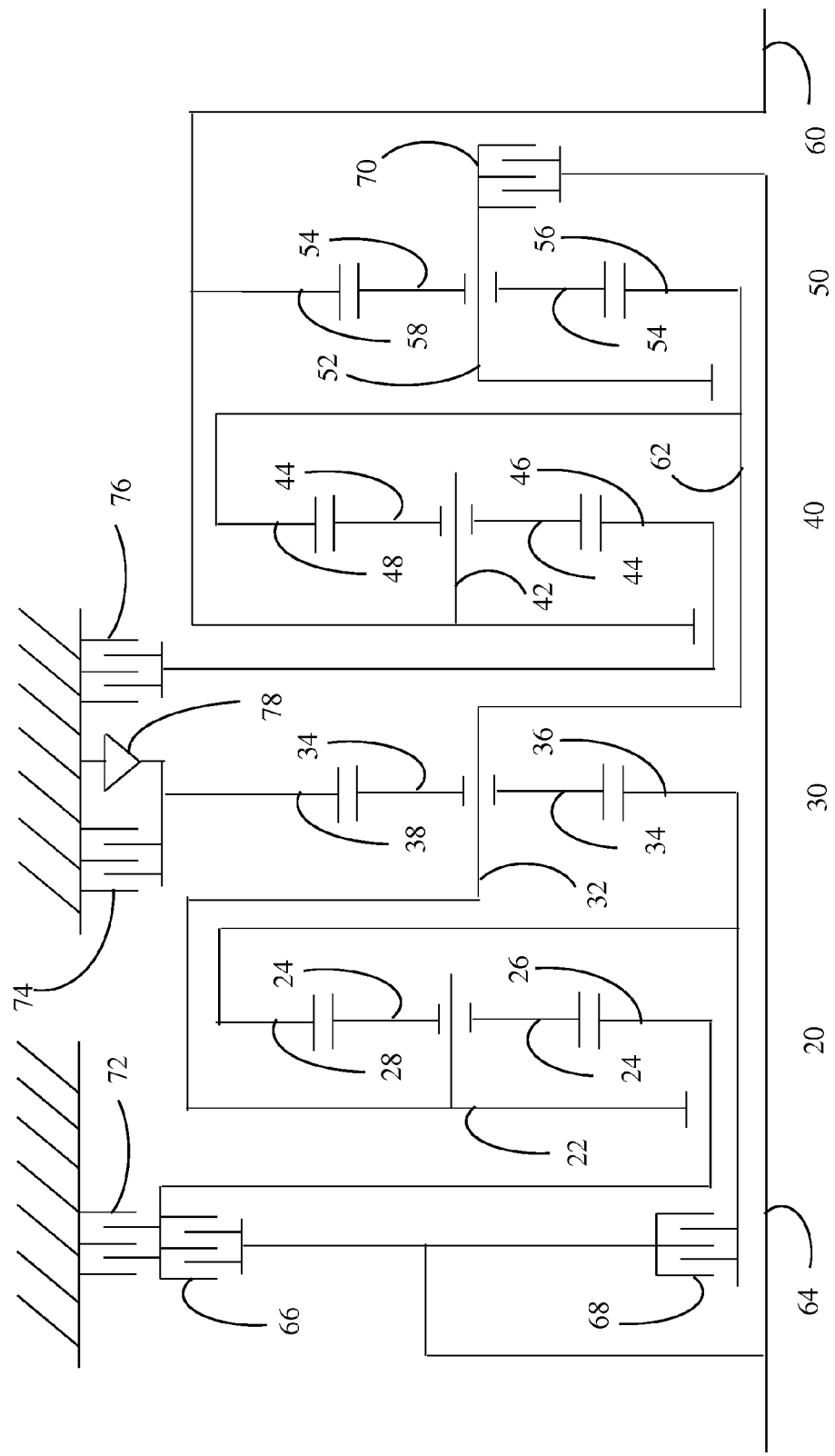
FIG. 1 is a schematic diagram of a first transmission gearing arrangement.

An example transmission is schematically illustrated in FIG. 1. The transmission utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes the fixed speed relationship that the speed of the carrier is between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier.

Carrier 22 is fixedly coupled to carrier 32 and ring gear 28 is fixedly coupled to sun gear 36. This produces a four element fixed gearing arrangement. The first element, sun gear 26, and the fourth element, the combination of ring gear 28 and sun gear 36, always have the most extreme speeds. The speeds of the second element, ring gear 38, and the third element, the combination of carrier 22 and carrier 32, have speeds that are a weighted average of the speeds of the first and fourth elements. Similarly, carrier 42 is fixedly coupled to ring gear 58 and ring gear 48 is fixedly coupled to sun gear 56, producing a second four element fixed gearing arrangement. The fifth element, sun gear 46, and the eighth element, the combination of ring gear 48 and sun gear 56, always have the most extreme speeds. The speeds of the sixth element, the combination of carrier 42 and ring gear 58, and the seventh element, carrier 52, have speeds that are a weighted average of the speeds of the fifth and eighth elements.

A suggested ratio of gear teeth for each planetary gear set in FIG. 1 is listed in Table 1.

TABLE 1

| | |
|---|---|
| Ring 28/Sun 26 | 1.85 |
| Ring 38/Sun 36 | 1.75 |
| Ring 48/Sun 46 | 1.60 |
| Ring 58/Sun 56 | 2.30 |

The sixth element, 42 and 58, is fixedly coupled to output shaft 60. The third element, 22 and 32, is fixedly coupled to the eighth element, 48 and 56, by intermediate shaft 62. Input shaft 64 is selectively coupled to the first element 26 by clutch 66, selectively coupled to the fourth element, 28 and 36, by clutch 68, and selectively coupled to the seventh element 52 by clutch 70. The first element 26 is selectively held against rotation by brake 72, the second element 38 is selectively held against rotation by brake 74, and the fifth element 46 is selectively held against rotation by brake 76.

As shown in Table 2, engaging the clutches and brakes in combinations of three establishes nine forward speed ratios and one reverse speed ratio between input shaft 64 and output shaft 60. An X indicates that the clutch is required to establish the speed ratio. An (X) indicates the clutch can be applied but is not required. When the gear sets of FIG. 1 have tooth numbers as indicated in Table 1, the speed ratios have the values indicated in Table 2. Gear sets 20 and 30, clutches 66 and 68, and brakes 72 and 74 form a front shiftable gearing arrangement that establishes a variety of speed ratios between intermediate shaft 62 and input shaft 64. Specifically, engaging clutch 66 and brake 74 establishes a reverse speed ratio in which intermediate shaft 62 rotates in the opposite direction of input shaft 64. Engaging both brakes 72 and 74 holds intermediate shaft 62 stationary. Engaging clutch 68 in combination with brake 72 and brake 74 respectively establishes two underdrive ratios in which intermediate shaft 62 rotates slower than input shaft 64. Finally, engaging both clutches 66 and 68 establishes a direct drive ratio in which intermediate shaft 62 rotates at the same speed as input shaft 64. Gear sets 40 and 50, clutch 70, and brake 76 form a rear shiftable gearing arrangement that establishes selectable speed relationships among input shaft 64, intermediate shaft 62, and output shaft 60. Specifically, when brake 76 is engaged, an underdrive ratio is established between intermediate shaft 62 and output shaft 60. This underdrive ratio, in combination with various speed ratios established by the front gearing arrangement, establishes the reverse ratio and the first three forward speed ratios of the transmission. When clutch 70 is engaged, the speed of input shaft 64 is constrained to be a weighted average between the speeds of intermediate shaft 62 and output shaft 60. This speed relationship, in combination with various speed ratios established by the front gearing arrangement, establishes the top five forward speed ratios of the transmission. The remaining transmission ratio, $4^{th}$, is established by engaging clutch 70 and brake 76 together. The front gearing arrangement is not involved in establishing the $4^{th}$ transmission ratio, but one of the clutches or brakes of the front gearing arrangement can be engaged if desired.

TABLE 2

| | 66 | 68 | 70 | 72 | 74/78 | 76 | Ratio | Step |
|---|---|---|---|---|---|---|---|---|
| Rev | X | | | | X | X | -3.64 | 81% |
| $1^{st}$ | | X | | | X | X | 4.47 | |
| $2^{nd}$ | | X | | X | | X | 2.50 | 1.79 |
| $3^{rd}$ | X | X | | | | X | 1.63 | 1.54 |
| $4^{th}$ | | (X) | X | | | X | 1.19 | 1.37 |
| $5^{th}$ | X | X | X | | | | 1.00 | 1.19 |
| $6^{th}$ | | X | X | X | | | 0.87 | 1.15 |
| $7^{th}$ | | X | X | | X | | 0.78 | 1.11 |
| $8^{th}$ | | | X | X | X | | 0.70 | 1.12 |
| $9^{th}$ | X | | X | | X | | 0.61 | 1.14 |

Optional one way brake 78 passively holds second element 38 against rotation in one direction while allowing rotation in the other direction. Including this element simplifies the shift from $1^{st}$ to $2^{nd}$ gear. If one way brake 78 is present, brake 74 is not engaged in $1^{st}$ gear. The shift to $2^{nd}$ gear merely requires the gradual engagement of brake 72. Once the torque capacity of brake 72 is sufficient, one way brake 78 will passively overrun. If one way brake 78 is omitted, then brake 74 is engaged in $1^{st}$ gear. The shift from $1^{st}$ gear to $2^{nd}$ gear is then accomplished by the coordinated release of brake 74 and engagement of brake 72. All remaining shift are accomplished by the coordinated release of one clutch or brake and the engagement of another clutch or brake.

Figure 2:
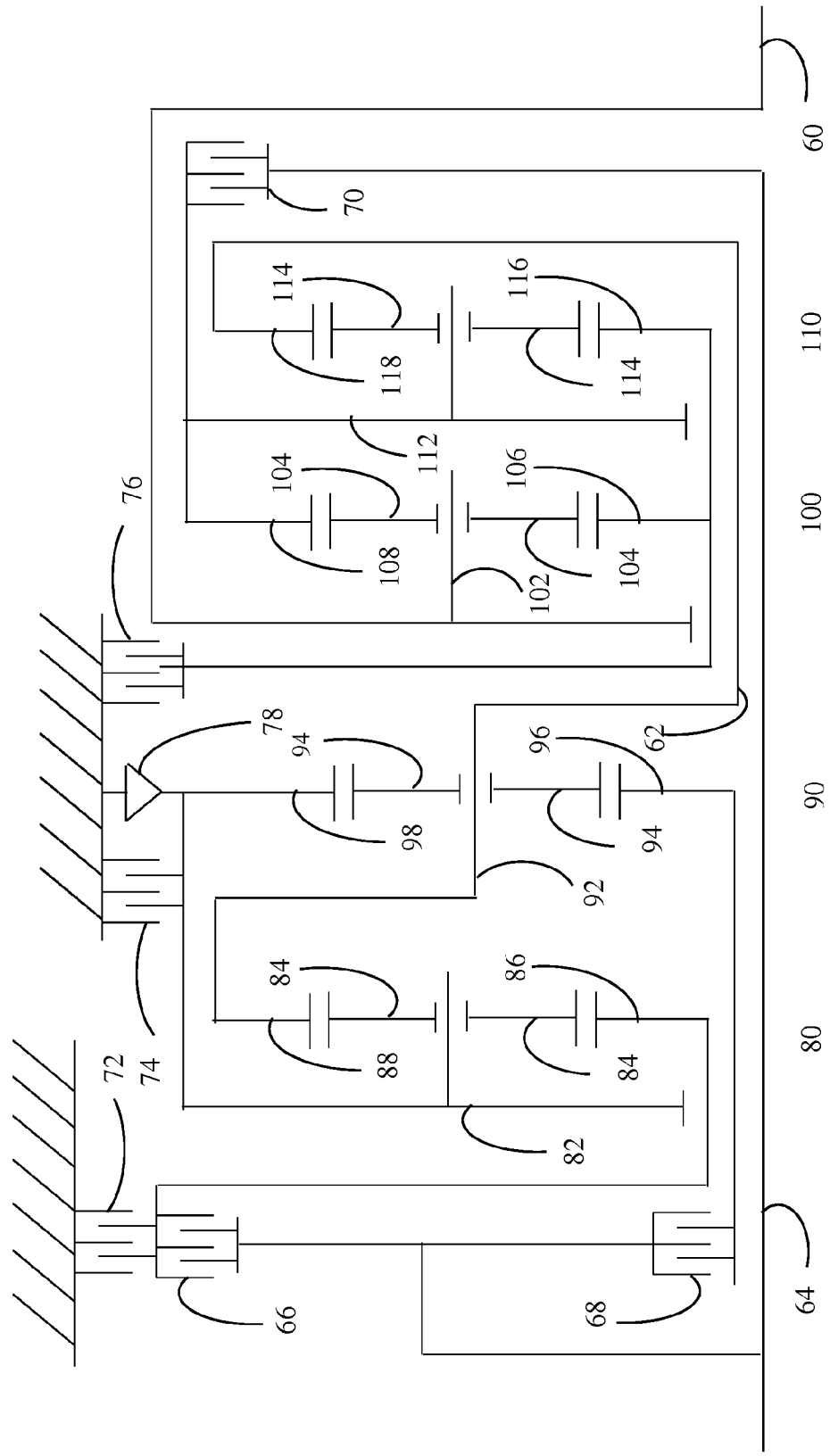
FIG. 2 is a schematic diagram of a second transmission gearing arrangement.

Another example transmission is illustrated in FIG. 2. The transmission utilizes four simple planetary gear sets 80, 90, 100, and 110. Carrier 82 is fixedly coupled to ring gear 98 and ring gear 88 is fixedly coupled to carrier 92, producing a four element fixed gearing arrangement. The first element, sun gear 86, and the fourth element, sun gear 96, always have the most extreme speeds. The speeds of the second element, the combination of carrier 82 and ring gear 98, and the third element, the combination of ring gear 88 and carrier 92, have speeds that are a weighted average of the speeds of the first and fourth elements. Similarly, sun gear 106 is fixedly coupled to sun gear 116 and ring gear 108 is fixedly coupled to carrier 112, producing a second four element fixed gearing arrangement. The fifth element, the combination of sun gear 106 and sun gear 116, and the eighth element, ring gear 118, always have the most extreme speeds. The speeds of the sixth element, carrier 102, and the seventh element, the combination of ring gear 108 and carrier 112, have speeds that are a weighted average of the speeds of the fifth and eighth elements.

A suggested ratio of gear teeth for each planetary gear set in FIG. 2 is listed in Table 3.

TABLE 3

| | |
|---|---|
| Ring 88/Sun 86 | 1.85 |
| Ring 98/Sun 96 | 1.70 |
| Ring 108/Sun 106 | 3.70 |
| Ring 118/Sun 116 | 2.30 |

The sixth element, 102, is fixedly coupled to output shaft 60. The third element, 88 and 92, is fixedly coupled to the eighth element 118 by intermediate shaft 62. Input shaft 64 is selectively coupled to the first element 86 by clutch 66, selectively coupled to the fourth element 96 by clutch 68, and selectively coupled to the seventh element, 108 and 112, by clutch 70. The first element 86 is selectively held against rotation by brake 72, the second element, 82 and 98, is selectively held against rotation by brake 74, and the fifth element, 106 and 116 is selectively held against rotation by brake 76. Optionally, one way brake 78 passively holds second element, 82 and 98, against rotation in one direction while allowing rotation in the other direction.

As shown in Table 4, engaging the clutches and brakes in combinations of three establishes nine forward speed ratios and one reverse speed ratio between input shaft 64 and output shaft 60. When the gear sets of FIG. 2 have tooth numbers as indicated in Table 3, the speed ratios have the values indicated in Table 4.

TABLE 4

| | 66 | 68 | 70 | 72 | 74/78 | 76 | Ratio | Step |
|---|---|---|---|---|---|---|---|---|
| Rev | X | | | | X | X | −3.37 | 69% |
| $1^{st}$ | | X | | | X | X | 4.92 | |
| $2^{nd}$ | | X | | X | | X | 2.91 | 1.69 |
| $3^{rd}$ | X | X | | | | X | 1.82 | 1.60 |
| $4^{th}$ | | (X) | X | | | X | 1.27 | 1.44 |
| $5^{th}$ | X | X | X | | | | 1.00 | 1.27 |
| $6^{th}$ | | X | X | X | | | 0.85 | 1.18 |
| $7^{th}$ | | X | X | | X | | 0.76 | 1.11 |
| $8^{th}$ | | | X | X | X | | 0.67 | 1.14 |
| $9^{th}$ | X | | X | | X | | 0.57 | 1.18 |

Figure 3:
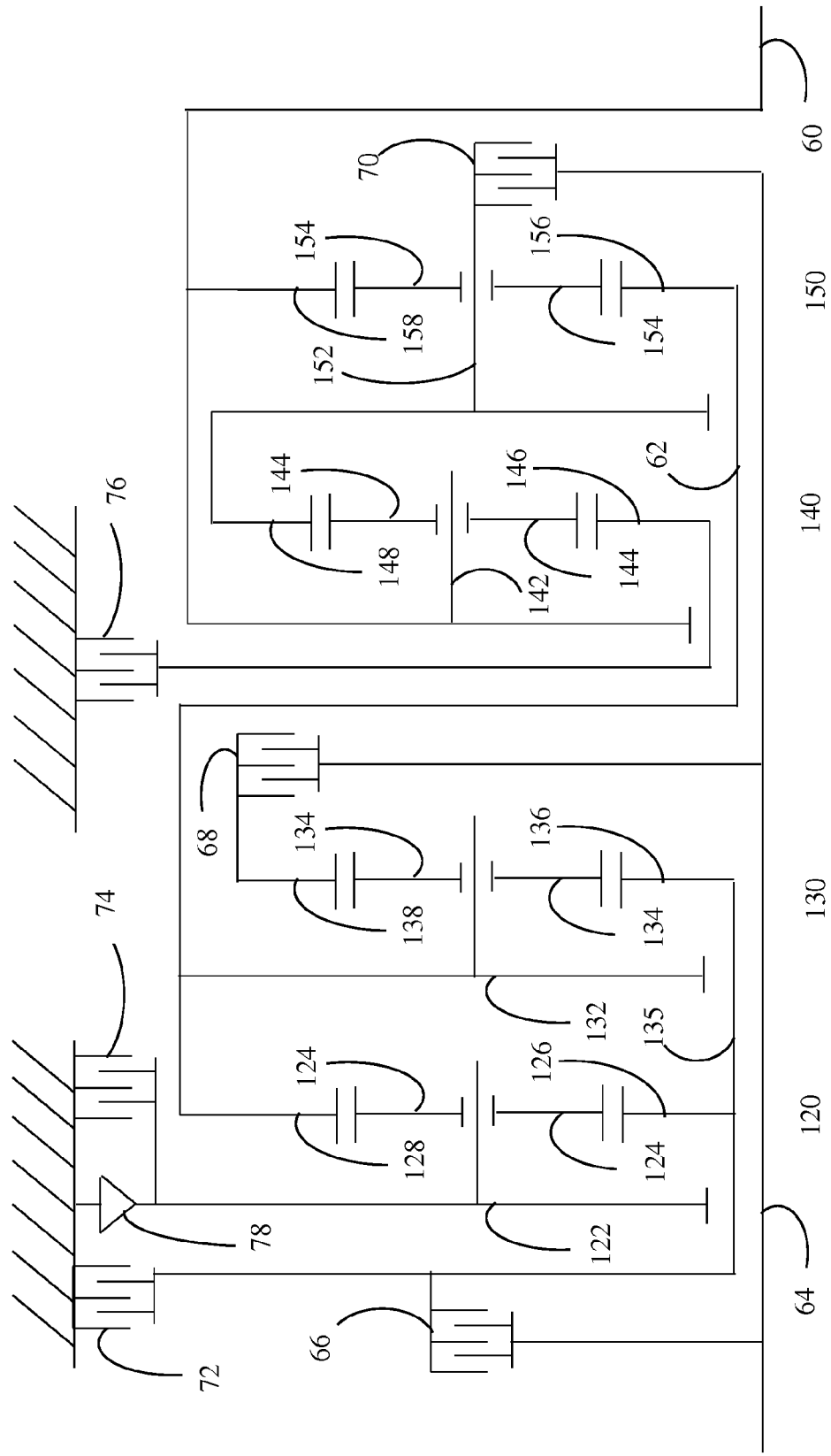
FIG. 3 is a schematic diagram of a third transmission gearing arrangement.

A third example transmission is illustrated in FIG. 3. The transmission utilizes four simple planetary gear sets 120, 130, 140, and 150. Sun gear 126 is fixedly coupled to sun gear 136 by intermediate shaft 135 and ring gear 128 is fixedly coupled to carrier 132, producing a four element fixed gearing arrangement. The first element, the combination of sun gear 126 and sun gear 136, and the fourth element, ring gear 138, always have the most extreme speeds. The speeds of the second element, carrier 122, and the third element, the combination of ring gear 128 and carrier 132, have speeds that are a weighted average of the speeds of the first and fourth elements. Similarly, carrier 142 is fixedly coupled to ring gear 158 and ring gear 148 is fixedly coupled to carrier 152, producing a second four element fixed gearing arrangement. The fifth element, sun gear 146, and the eighth element, sun gear 156, always have the most extreme speeds. The speeds of the sixth element, the combination of carrier 142 and ring gear 158, and the seventh element, the combination of ring gear 148 and carrier 152, have speeds that are a weighted average of the speeds of the fifth and eighth elements.

A suggested ratio of gear teeth for each planetary gear set in FIG. 3 is listed in Table 5.

TABLE 5

| | |
|---|---|
| Ring 128/Sun 126 | 2.00 |
| Ring 138/Sun 136 | 1.90 |
| Ring 148/Sun 146 | 3.70 |
| Ring 158/Sun 156 | 1.70 |

The sixth element, 142 and 158, is fixedly coupled to output shaft 60. The third element, 128 and 132, is fixedly coupled to the eighth element 156 by intermediate shaft 62. Input shaft 64 is selectively coupled to the first element, 126 and 136, by clutch 66, selectively coupled to the fourth element 138 by clutch 68, and selectively coupled to the seventh element, 148 and 152, by clutch 70. The first element, 126 and 136, is selectively held against rotation by brake 72, the second element 122 is selectively held against rotation by brake 74, and the fifth element 146 is selectively held against rotation by brake 76. Optionally, one way brake 78 passively holds second element 122 against rotation in one direction while allowing rotation in the other direction.

As shown in Table 6, engaging the clutches and brakes in combinations of three establishes nine forward speed ratios and one reverse speed ratio between input shaft 64 and output shaft 60. When the gear sets of FIG. 3 have tooth numbers as indicated in Table 5, the speed ratios have the values indicated in Table 6.

TABLE 6

| | 66 | 68 | 70 | 72 | 74/78 | 76 | Ratio | Step |
|---|---|---|---|---|---|---|---|---|
| Rev | X | | | | X | X | −3.46 | 78% |
| $1^{st}$ | | X | | | X | X | 4.46 | |
| $2^{nd}$ | | X | | X | | X | 2.64 | 1.69 |
| $3^{rd}$ | X | X | | | | X | 1.73 | 1.53 |
| $4^{th}$ | | (X) | X | | | X | 1.27 | 1.36 |
| $5^{th}$ | X | X | X | | | | 1.00 | 1.27 |
| $6^{th}$ | | X | X | X | | | 0.83 | 1.20 |
| $7^{th}$ | | X | X | | X | | 0.74 | 1.13 |
| $8^{th}$ | | | X | X | X | | 0.63 | 1.17 |
| $9^{th}$ | X | | X | | X | | 0.53 | 1.19 |

Figure 4:
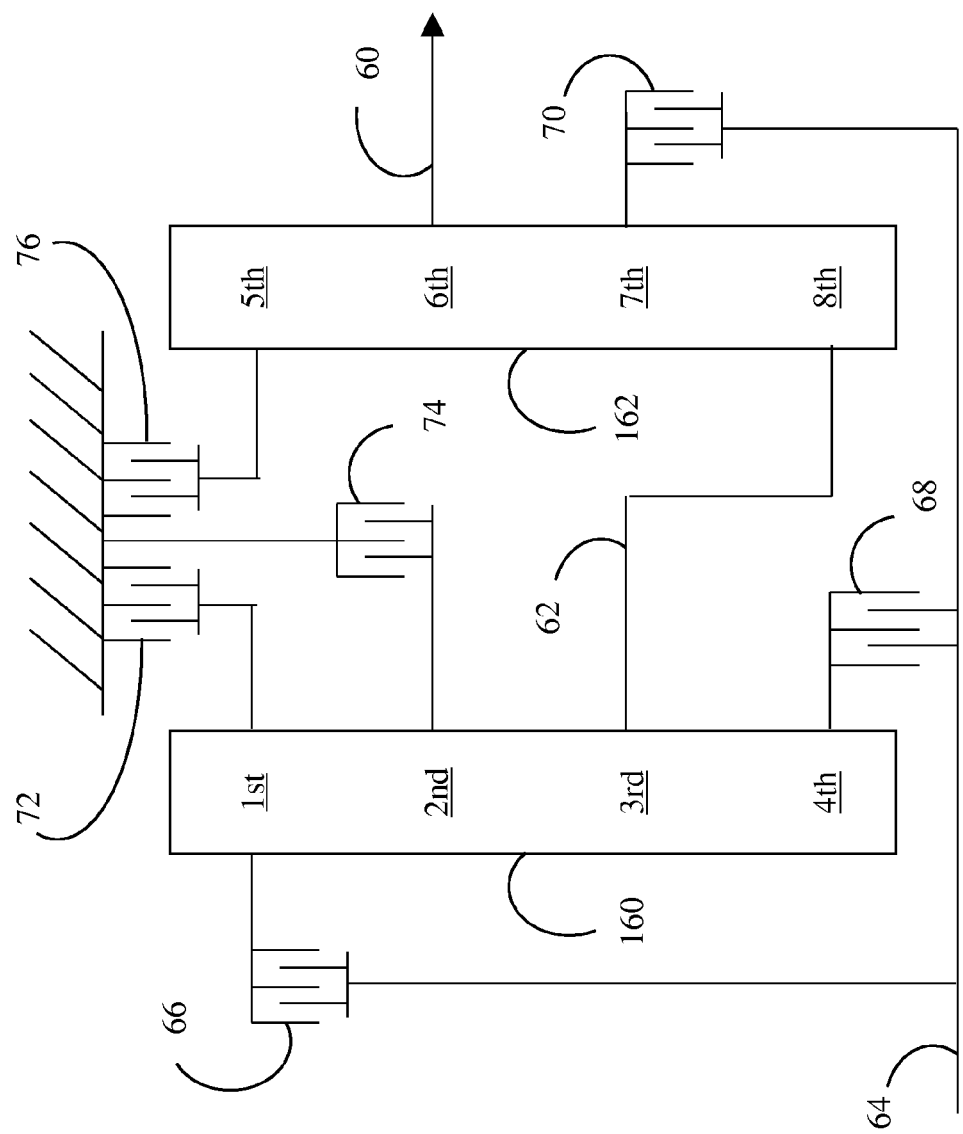
FIG. 4 is a lever diagram corresponding to the first, second, and third transmission gearing arrangements.

FIG. 4 describes the transmissions of FIGS. 1, 2, and 3 in the form of a lever diagram. Gear elements which rotate about a common axis and have speeds with a fixed linear relationship are shown along a lever according to their relative speeds. The two elements that have the most extreme speeds are shown at the endpoints of the lever. The remaining elements are shown at intermediate points according to the weighting factors. Lever 160 corresponds to gear sets 20 and 30 of FIG. 1, gear sets 80 and 90 of FIG. 2, and gear sets 120 and 130 of FIG. 3. Any four element fixed gearing arrangement that imposes the designated speed relationships with appropriate weighting factors can be substituted for the corresponding gear sets without impacting the transmission speed ratios. In addition to the fixed gearing arrangements illustrated in FIG. 1-3, many others are known. Any combination of two planetary gear sets with two elements of each fixedly connected to two elements of the other forms a four element fixed gearing arrangement. Some fixed gearing arrangements will be preferable to others in terms of packaging, efficiency, and planet gear speeds. Similarly, lever 162 corresponds to gear sets 40 and 50 of FIG. 1, gear sets 100 and 110 of FIG. 2, and gear sets 140 and 150 of FIG. 3. Any four element fixed gearing arrangement that imposes the designated speed relationships can be substituted for the corresponding gear sets.

Figure 5:
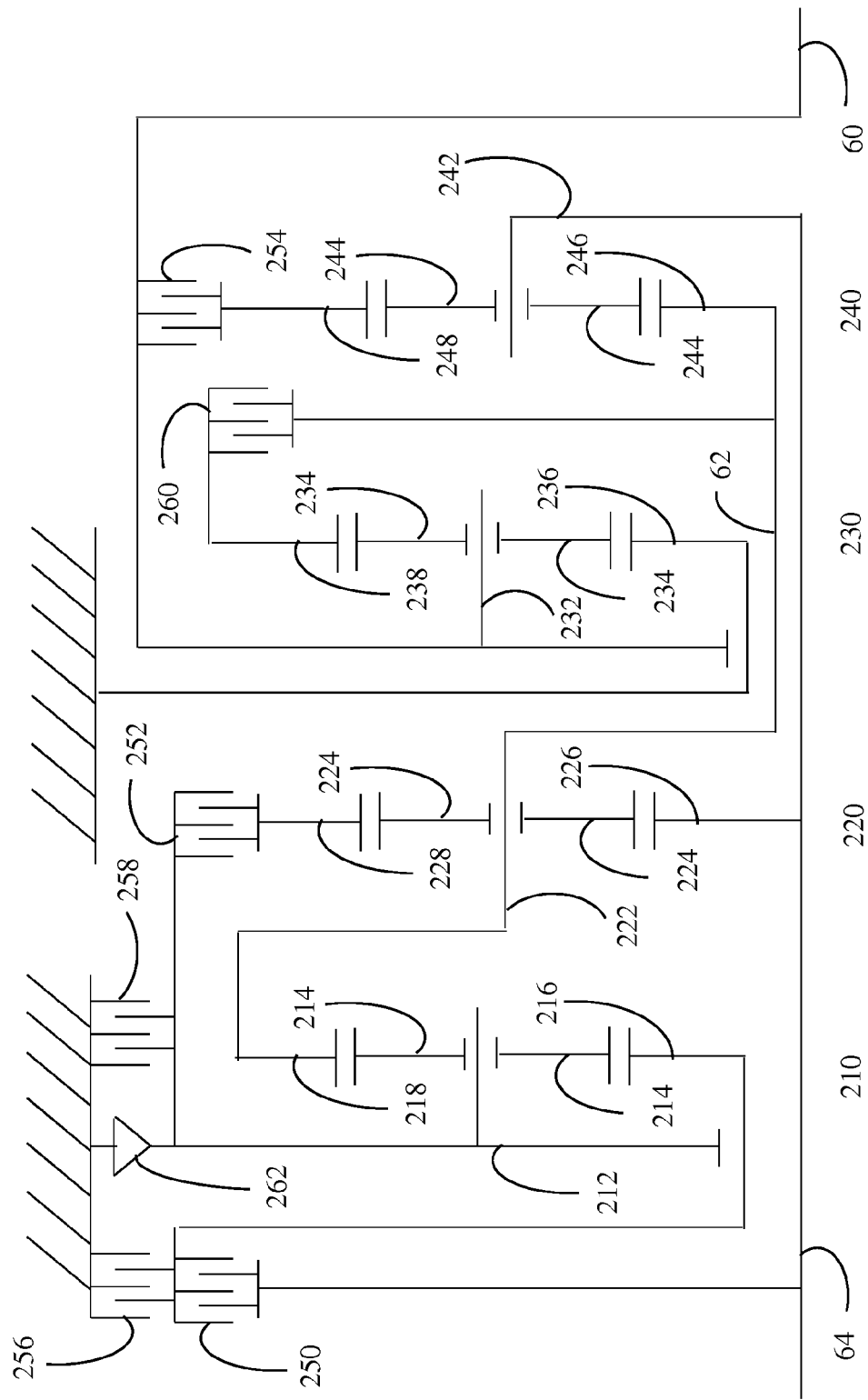
FIG. 5 is a schematic diagram of a fourth transmission gearing arrangement.

A fourth example transmission is illustrated in FIG. 5. The transmission utilizes four simple planetary gear sets 210, 220, 230, and 240. Ring gear 218 and carrier 222 are fixedly coupled to sun gear 246 by intermediate shaft 62. Carrier 232 is fixedly coupled to output shaft 60. Sun gear 226 and carrier 242 are fixedly coupled to input shaft 64. Sun gear 236 is fixedly held against rotation. A suggested ratio of gear teeth for each planetary gear set in FIG. 5 is listed in Table 7.

TABLE 7

| Ring 218/Sun 216 | 1.85 |
|---|---|
| Ring 228/Sun 226 | 1.70 |
| Ring 238/Sun 236 | 1.60 |
| Ring 248/Sun 246 | 2.30 |

Sun gear 216 is selectively coupled to input shaft 64 by clutch 250 and selectively held against rotation by brake 256. Carrier 212 is selectively coupled to ring gear 228 by clutch 252 and selectively held against rotation by brake 258. Ring gear 238 is selectively coupled to sun gear 246 and intermediate shaft 62 by clutch 260. Ring gear 248 is selectively coupled to carrier 232 and output shaft 60 by clutch 254. Optionally, one way brake 262 passively holds carrier 212 against rotation in one direction while allowing rotation in the other direction.

As shown in Table 8, engaging the clutches and brakes in combinations of three establishes nine forward speed ratios and one reverse speed ratio between input shaft 64 and output shaft 60. When the gear sets of FIG. 5 have tooth numbers as indicated in Table 7, the speed ratios have the values indicated in Table 8.

TABLE 8

| | 250 | 252 | 254 | 256 | 258/262 | 260 | Ratio | Step |
|---|---|---|---|---|---|---|---|---|
| Rev | X | | | | X | X | −3.01 | 69% |
| $1^{st}$ | | X | | | X | X | 4.39 | |
| $2^{nd}$ | | X | | X | | X | 2.59 | 1.69 |
| $3^{rd}$ | X | X | | | | X | 1.63 | 1.60 |
| $4^{th}$ | | (X) | X | | | X | 1.19 | 1.37 |
| $5^{th}$ | X | X | X | | | | 1.00 | 1.19 |
| $6^{th}$ | | X | X | X | | | 0.86 | 1.16 |
| $7^{th}$ | | X | X | | X | | 0.79 | 1.10 |
| $8^{th}$ | | | X | X | X | | 0.70 | 1.13 |
| $9^{th}$ | X | | X | | X | | 0.60 | 1.16 |

Figure 6:
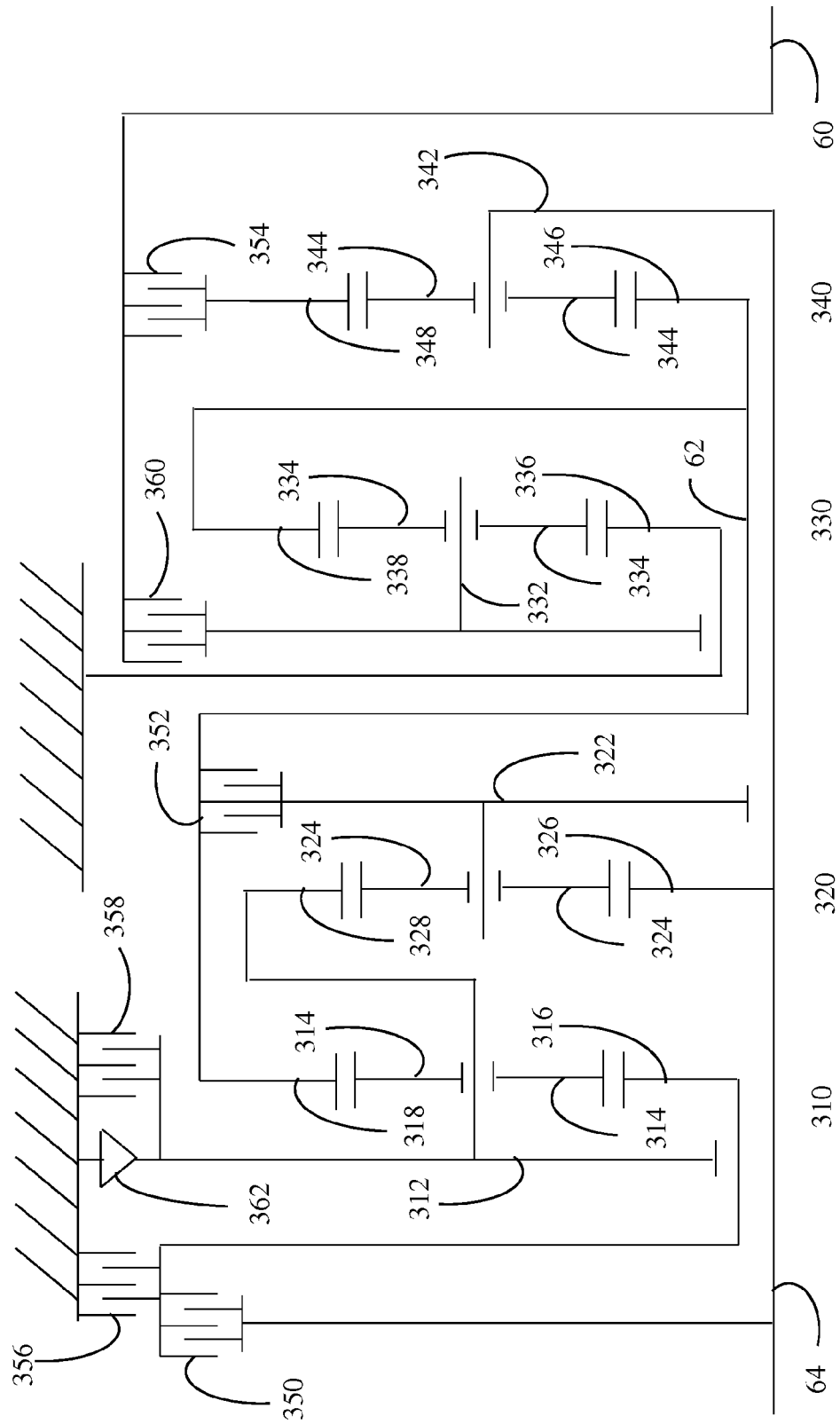
FIG. 6 is a schematic diagram of a fifth transmission gearing arrangement.

A fifth example transmission is illustrated in FIG. 6. The transmission utilizes four simple planetary gear sets 310, 320, 330, and 340. Ring gear 318 is fixedly coupled to ring gear 338 and sun gear 346 by intermediate shaft 62. Carrier 312 is fixedly coupled to ring gear 328. Sun gear 326 and carrier 342 are fixedly coupled to input shaft 64. Sun gear 336 is fixedly held against rotation. A suggested ratio of gear teeth for each planetary gear set in FIG. 5 is listed in Table 9.

TABLE 9

| Ring 318/Sun 316 | 1.85 |
|---|---|
| Ring 328/Sun 326 | 1.70 |
| Ring 338/Sun 336 | 1.60 |
| Ring 348/Sun 346 | 2.30 |

Sun gear 316 is selectively coupled to input shaft 64 by clutch 350 and selectively held against rotation by brake 356. Carrier 312 and ring gear 328 are selectively held against rotation by brake 358. Carrier 322 is selectively coupled to ring gear 318 and intermediate shaft 62 by clutch 352. Output shaft 60 is selectively coupled to carrier 332 by clutch 360 and selectively coupled to ring gear 348 by clutch 354. Optionally, one way brake 362 passively holds carrier 312 and ring gear 328 against rotation in one direction while allowing rotation in the other direction.

As shown in Table 10, engaging the clutches and brakes in combinations of three establishes nine forward speed ratios and one reverse speed ratio between input shaft 64 and output shaft 60. When the gear sets of FIG. 6 have tooth numbers as indicated in Table 9, the speed ratios have the values indicated in Table 10.

TABLE 10

| | 350 | 352 | 354 | 356 | 358/362 | 360 | Ratio | Step |
|---|---|---|---|---|---|---|---|---|
| Rev | X | | | | X | X | −3.01 | 69% |
| $1^{st}$ | | X | | | X | X | 4.39 | |
| $2^{nd}$ | | X | | X | | X | 2.59 | 1.69 |
| $3^{rd}$ | X | X | | | | X | 1.63 | 1.60 |
| $4^{th}$ | | (X) | X | | | X | 1.19 | 1.37 |
| $5^{th}$ | X | X | X | | | | 1.00 | 1.19 |
| $6^{th}$ | | X | X | X | | | 0.86 | 1.16 |
| $7^{th}$ | | X | X | | X | | 0.79 | 1.10 |
| $8^{th}$ | | | X | X | X | | 0.70 | 1.13 |
| $9^{th}$ | X | | X | | X | | 0.60 | 1.16 |

Figure 7:
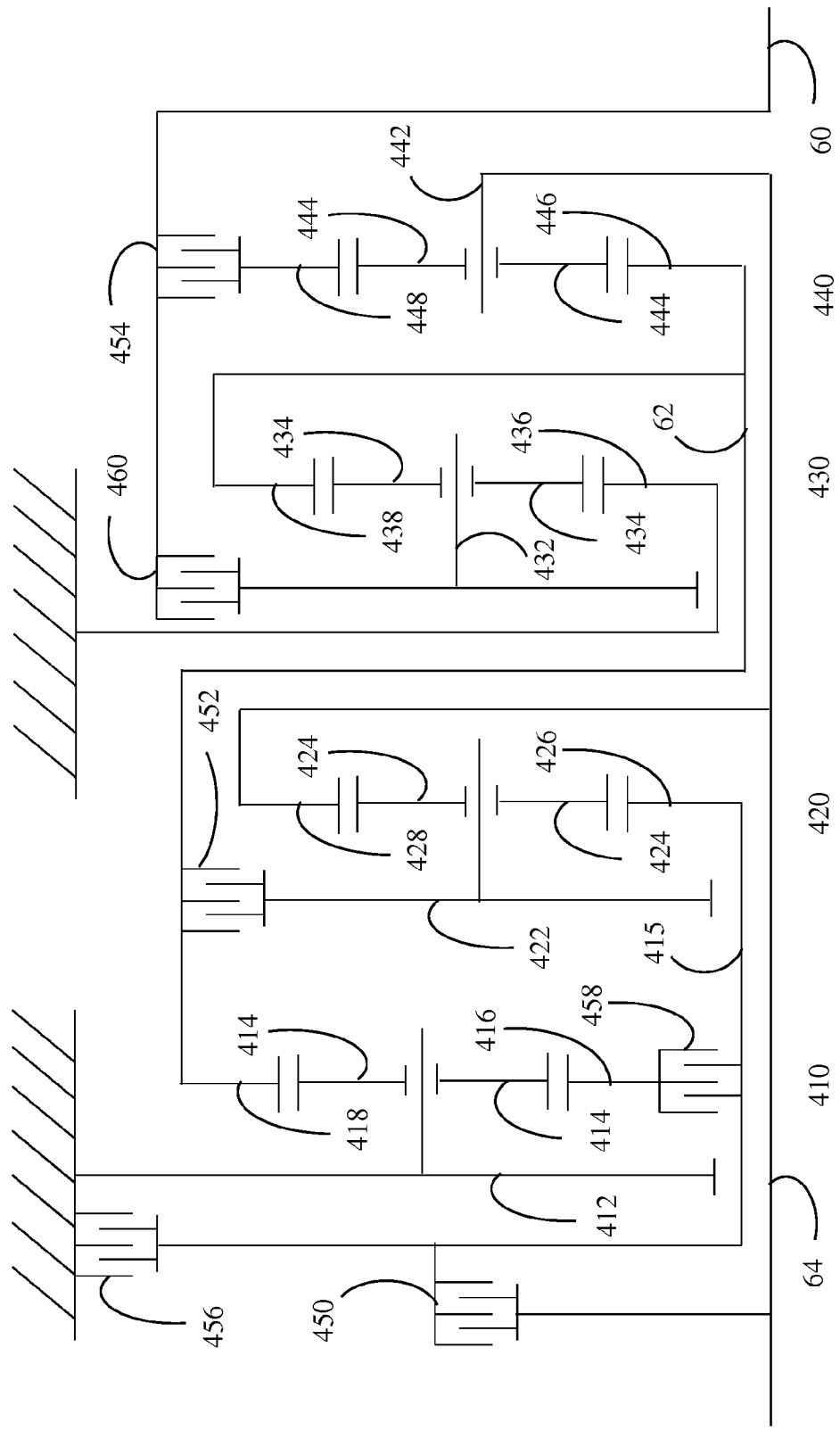
FIG. 7 is a schematic diagram of a sixth transmission gearing arrangement.

A sixth example transmission is illustrated in FIG. 7. The transmission utilizes four simple planetary gear sets 410, 420, 430, and 440. Ring gear 418 is fixedly coupled to ring gear 438 and sun gear 446 by intermediate shaft 62. Sun gear 426 is fixedly coupled to intermediate shaft 415. Ring gear 428 and carrier 442 are fixedly coupled to input shaft 64. Carrier 412 and sun gear 436 are fixedly held against rotation. A suggested ratio of gear teeth for each planetary gear set in FIG. 7 is listed in Table 11.

TABLE 11

| Ring 418/Sun 416 | 2.00 |
|---|---|
| Ring 428/Sun 426 | 1.90 |
| Ring 438/Sun 436 | 1.60 |
| Ring 448/Sun 446 | 2.30 |

Intermediate shaft 415 is selectively coupled to input shaft 64 by clutch 450, selectively coupled to sun gear 416 by clutch 458, and selectively held against rotation by brake 456. Carrier 422 is selectively coupled to ring gear 418 and intermediate shaft 62 by clutch 452. Output shaft 60 is selectively coupled to carrier 432 by clutch 460 and selectively coupled to ring gear 448 by clutch 454.

As shown in Table 12, engaging the clutches and brakes in combinations of three establishes nine forward speed ratios and one reverse speed ratio between input shaft 64 and output shaft 60. When the gear sets of FIG. 7 have tooth numbers as indicated in Table 11, the speed ratios have the values indicated in Table 12.

TABLE 12

| | 450 | 452 | 454 | 456 | 458 | 460 | Ratio | Step |
|---|---|---|---|---|---|---|---|---|
| Rev | X | | | X | | X | −3.25 | 78% |
| $1^{st}$ | | X | | X | | X | 4.19 | |
| $2^{nd}$ | | X | | X | | X | 2.48 | 1.69 |
| $3^{rd}$ | X | X | | | | X | 1.63 | 1.53 |
| $4^{th}$ | | (X) | X | | | X | 1.19 | 1.37 |
| $5^{th}$ | X | X | X | | | | 1.00 | 1.19 |
| $6^{th}$ | | X | X | X | | | 0.87 | 1.15 |
| $7^{th}$ | | X | X | | X | | 0.79 | 1.10 |
| $8^{th}$ | | | X | X | X | | 0.70 | 1.13 |
| $9^{th}$ | X | | X | | X | | 0.61 | 1.15 |

Figure 8:
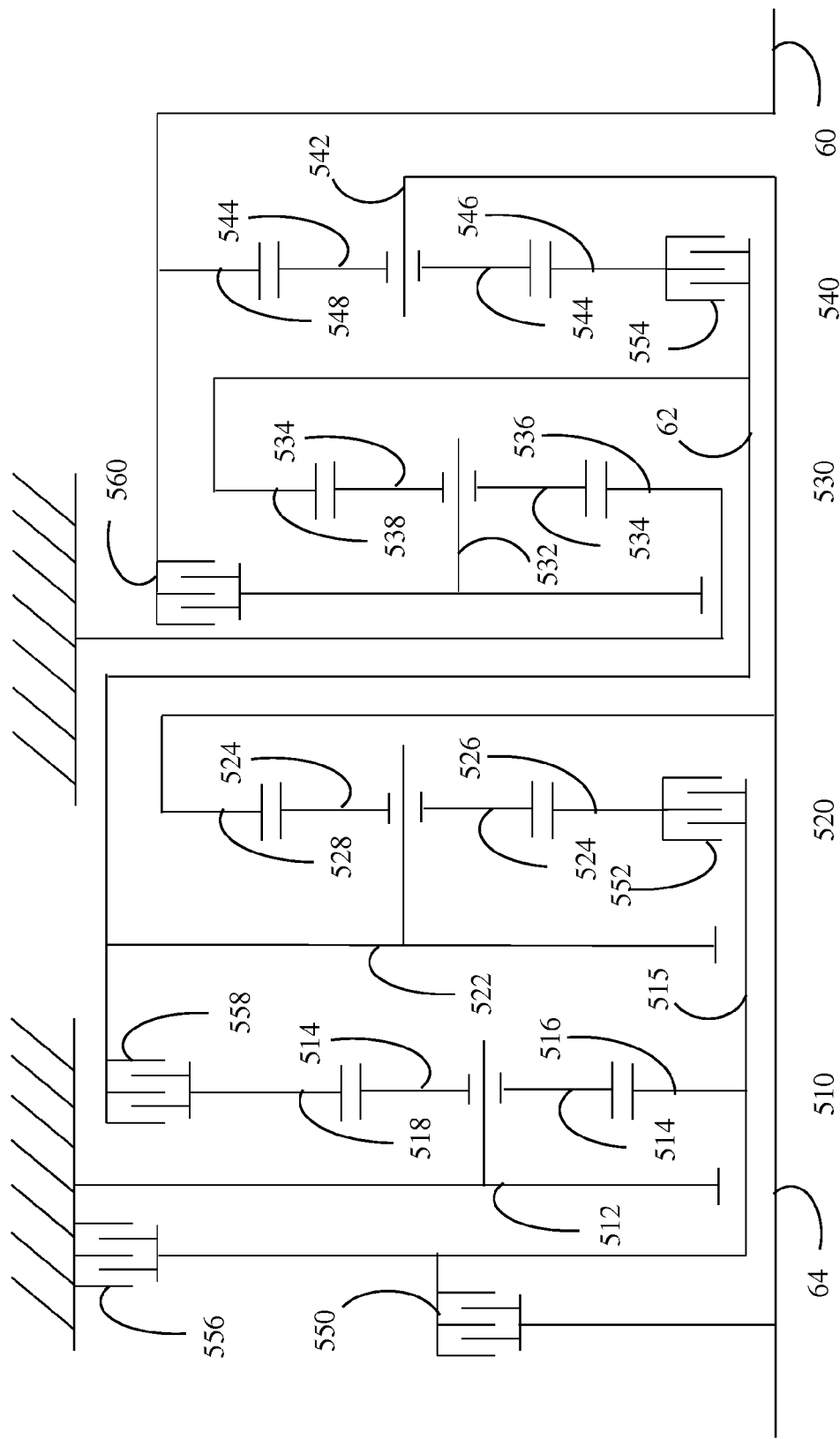
FIG. 8 is a schematic diagram of a seventh transmission gearing arrangement.

A seventh example transmission is illustrated in FIG. 8. The transmission utilizes four simple planetary gear sets 510, 520, 530, and 540. Carrier 522 is fixedly coupled to ring gear 538 by intermediate shaft 62. Sun gear 516 is fixedly coupled to intermediate shaft 515. Ring gear 548 is fixedly coupled to output shaft 60. Ring gear 528 and carrier 542 are fixedly coupled to input shaft 64. Carrier 512 and sun gear 536 are fixedly held against rotation. A suggested ratio of gear teeth for each planetary gear set in FIG. 8 is listed in Table 13.

TABLE 13

| Ring 518/Sun 516 | 2.00 |
|---|---|
| Ring 528/Sun 526 | 1.90 |
| Ring 538/Sun 536 | 1.60 |
| Ring 548/Sun 546 | 2.30 |

Intermediate shaft 515 is selectively coupled to input shaft 64 by clutch 550, selectively coupled to sun gear 526 by clutch 552, and selectively held against rotation by brake 556. Ring gear 518 is selectively coupled to carrier 522 and intermediate shaft 62 by clutch 558. Output shaft 60 is selectively coupled to carrier 532 by clutch 560. Sun gear 546 is selectively coupled to intermediate shaft 62 by clutch 554.

As shown in Table 14, engaging the clutches and brakes in combinations of three establishes nine forward speed ratios and one reverse speed ratio between input shaft 64 and output shaft 60. When the gear sets of FIG. 8 have tooth numbers as indicated in Table 13, the speed ratios have the values indicated in Table 14.

TABLE 14

| | 550 | 552 | 554 | 556 | 558 | 560 | Ratio | Step |
|---|---|---|---|---|---|---|---|---|
| Rev | X | | | X | X | | −3.25 | 78% |
| 1st | | X | | X | | X | 4.19 | |
| 2nd | | X | | X | | X | 2.48 | 1.69 |
| 3rd | X | X | | | | X | 1.63 | 1.53 |
| 4th | | (X) | X | | | X | 1.19 | 1.37 |
| 5th | X | X | X | | | | 1.00 | 1.19 |
| 6th | | X | X | X | | | 0.87 | 1.15 |
| 7th | | X | X | | X | | 0.79 | 1.10 |
| 8th | | X | X | X | | | 0.70 | 1.13 |
| 9th | X | | X | | X | | 0.61 | 1.15 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input shaft;
   an output shaft;
   a first intermediate shaft;
   a first shiftable gearing arrangement configured to selectively establish at least five speed ratios between the first intermediate shaft and the input shaft, the speed ratios including a reverse ratio, a zero ratio, two underdrive ratios, and a direct drive ratio;
   a second shiftable gearing arrangement configured to selectively constrain the output shaft to rotate at a speed between zero and a speed of the first intermediate shaft, the second shiftable gearing arrangement comprising a first simple planetary gear set having a first sun gear fixedly held against rotation, a first planet carrier coupled to the output shaft, a first ring gear coupled to the first intermediate shaft, and a first plurality of planet gears supported for rotation relative to the first planet carrier and in continuous meshing engagement with both the first sun gear and the first ring gear; and
   a first fixed gearing arrangement configured to fixedly constrain the input shaft to rotate at a speed between speeds of an eighth element and a sixth element, wherein the eighth element is coupled to the first intermediate shaft and the sixth element is coupled to the output shaft.

2. The transmission of claim 1 wherein
   the eighth element is fixedly coupled to the first intermediate shaft; and
   a first clutch selectively couples the sixth element to the output shaft.

3. The transmission of claim 1 wherein
   the sixth element is fixedly coupled to the output shaft; and
   a first clutch selectively couples the eighth element to the first intermediate shaft.

4. The transmission of claim 1 wherein the first shiftable gearing arrangement comprises
   a second intermediate shaft;
   a third shiftable gearing arrangement configured to selectively constrain the first intermediate shaft and second intermediate shaft to rotate in opposite directions or to both be stationary;
   a fourth shiftable gearing arrangement configured to selectively constrain the first intermediate shaft to rotate at a speed between the speeds of the input shaft and the second intermediate shaft;
   a second clutch selectively coupling the second intermediate shaft to the input shaft; and
   a first brake selectively holding the second intermediate shaft against rotation.

5. The transmission of claim 4 wherein the third shiftable gearing arrangement comprises
   a second simple planetary gear set having a second sun gear, a second planet carrier fixedly held against rotation, a second ring gear fixedly coupled to the first intermediate shaft, and a second plurality of planet gears supported for rotation relative to the second planet carrier and in continuous meshing engagement with both the second sun gear and the second ring gear; and
   a third clutch selectively coupling the second sun gear to the second intermediate shaft.

6. The transmission of claim 4 wherein the third shiftable gearing arrangement comprises
- a second simple planetary gear set having a second sun gear fixedly coupled to the second intermediate shaft, a second planet carrier fixedly held against rotation, a second ring gear, and a second plurality of planet gears supported for rotation relative to the second planet carrier and in continuous meshing engagement with both the second sun gear and the second ring gear; and
- a third clutch selectively coupling the second ring gear to the first intermediate shaft.

7. The transmission of claim 4 wherein the fourth shiftable gearing arrangement comprises
- a second simple planetary gear set having a second sun gear fixedly coupled to the second intermediate shaft, a second planet carrier, a second ring gear fixedly coupled to the input shaft, and a second plurality of planet gears supported for rotation relative to the second planet carrier and in continuous meshing engagement with both the second sun gear and the second ring gear; and
- a third clutch selectively coupling the second planet carrier to the first intermediate shaft.

8. The transmission of claim 4 wherein the fourth shiftable gearing arrangement comprises
- a second simple planetary gear set having a second sun gear, a second planet carrier fixedly coupled to the first intermediate shaft, a second ring gear fixedly coupled to the input shaft, and a second plurality of planet gears supported for rotation relative to the second planet carrier and in continuous meshing engagement with both the second sun gear and the second ring gear; and
- a third clutch selectively coupling the second sun gear to the second intermediate shaft.

9. The transmission of claim 1 wherein the first shiftable gearing arrangement comprises
- a second fixed gearing arrangement configured to fixedly constrain a second element to rotate at a speed between the speeds of a first element and the intermediate shaft;
- a third shiftable gearing arrangement configured to selectively constrain the first intermediate shaft to rotate at a speed between the speeds of the second element and the input shaft;
- a second clutch selectively coupling the first element to the input shaft;
- a first brake selectively holding the first element against rotation; and
- a second brake selectively holding the second element against rotation.

10. The transmission of claim 9 wherein the third shiftable gearing arrangement comprises
- a second simple planetary gear set having a second sun gear fixedly coupled to the input shaft, a second planet carrier, a second ring gear fixedly coupled to the second element, and a second plurality of planet gears supported for rotation relative to the second planet carrier and in continuous meshing engagement with both the second sun gear and the second ring gear; and
- a third clutch selectively coupling the second planet carrier to the first intermediate shaft.

11. The transmission of claim 9 wherein the third shiftable gearing arrangement comprises
- a second simple planetary gear set having a second sun gear fixedly coupled to the input shaft, a second planet carrier fixedly coupled to the first intermediate shaft, a second ring gear, and a second plurality of planet gears supported for rotation relative to the second planet carrier and in continuous meshing engagement with both the second sun gear and the second ring gear; and
- a third clutch selectively coupling the second ring gear to the second element.

12. The transmission of claim 1 wherein
- the first ring gear is fixedly coupled to the first intermediate shaft; and
- the first planet carrier is selectively coupled to the output shaft by a second clutch.

13. The transmission of claim 1 wherein
- the first planet carrier is fixedly coupled to the output shaft; and
- the first ring gear is selectively coupled to first intermediate shaft by a second clutch.

14. A transmission comprising:
- an input shaft;
- an output shaft;
- an intermediate shaft;
- a first fixed gearing arrangement configured to fixedly constrain a second element to rotate at a speed between the speeds of a first element and the intermediate shaft;
- a first shiftable gearing arrangement configured to selectively constrain the intermediate shaft to rotate at a speed between the speeds of the second element and the input shaft;
- a second shiftable gearing arrangement configured to selectively constrain the output shaft to rotate at a speed between zero and the speed of the intermediate shaft and to selectively constrain the input shaft to rotate at a speed between speeds of the intermediate shaft and the output shaft;
- a first clutch selectively coupling the first element to the input shaft;
- a first brake selectively holding the first element against rotation; and
- a second brake selectively holding the second element against rotation.

15. The transmission of claim 14 further comprising a one way brake restraining the second element from rotating in one direction and allowing rotation in the opposite direction.

16. The transmission of claim 14 wherein the first shiftable gearing arrangement comprises
- a simple planetary gear set having a sun gear fixedly coupled to the input shaft, a planet carrier, a ring gear fixedly coupled to the second element, and a plurality of planet gears supported for rotation relative to the planet carrier and in continuous meshing engagement with both the sun gear and the ring gear; and
- a second clutch selectively coupling the carrier to the intermediate shaft.

17. The transmission of claim 14 wherein the first shiftable gearing arrangement comprises
- a simple planetary gear set having a sun gear, a planet carrier fixedly coupled to the intermediate shaft, a ring gear fixedly coupled to the second element, and a plurality of planet gears supported for rotation relative to the planet carrier and in continuous meshing engagement with both the sun gear and the ring gear; and
- a second clutch selectively coupling the sun gear to the input shaft.

18. The transmission of claim 14 wherein the first shiftable gearing arrangement comprises
- a simple planetary gear set having a sun gear fixedly coupled to the input shaft, a planet carrier fixedly coupled to the intermediate shaft, a ring gear, and a plurality of planet gears supported for rotation relative to the planet carrier and in continuous meshing engagement with both the sun gear and the ring gear; and a second clutch selectively coupling the ring gear to the second element.

19. The transmission of claim 14 wherein the second shiftable gearing arrangement comprises a second fixed gearing arrangement comprising fifth, sixth, seventh, and eighth elements wherein the eighth element is fixedly coupled to the intermediate shaft and the sixth element is fixedly coupled to the output shaft;

a second clutch selectively coupling the seventh element to the input shaft; and a third brake selectively holding the fifth element against rotation.

20. The transmission of claim 19 wherein the second fixed gearing arrangement comprises a first simple planetary gear set having a first sun gear, a first planet carrier fixedly coupled to the output shaft, a first ring gear, and a first plurality of planet gears supported for rotation relative to the first planet carrier and in continuous meshing engagement with both the first sun gear and the first ring gear; and a second simple planetary gear set having a second sun gear fixedly coupled to the first sun gear, a second planet carrier fixedly coupled to the first ring gear, a second ring gear fixedly coupled to the intermediate shaft, and a second plurality of planet gears supported for rotation relative to the second planet carrier and in continuous meshing engagement with both the second sun gear and the second ring gear.

21. The transmission of claim 14 wherein the first shiftable gearing arrangement comprises a simple planetary gear set having a sun gear fixedly held against rotation, a planet carrier fixedly coupled to the output shaft, a ring gear, and a plurality of planet gears supported for rotation relative to the planet carrier and in continuous meshing engagement with both the sun gear and the ring gear; and a second clutch selectively coupling the ring gear to the intermediate shaft.

22. The transmission of claim 14 wherein the first shiftable gearing arrangement comprises a simple planetary gear set having a sun gear fixedly coupled to the intermediate shaft, a planet carrier fixedly coupled to the input shaft, a ring gear, and a plurality of planet gears supported for rotation relative to the planet carrier and in continuous meshing engagement with both the sun gear and the ring gear; and a second clutch selectively coupling the ring gear to the output shaft.

23. A transmission comprising:

an input;

an output;

an intermediate shaft; and four planetary gear sets, six clutches, and a one way clutch configured such that applying the six clutches and one way clutch in combinations of three produces ten ratios of a speed of the input to a speed of the output and wherein the one way clutch transmits torque in a highest of the ten ratios and overruns in a next highest of the ten ratios and wherein two of the four planetary gear sets, four of the six clutches, and the one way clutch are configured such that applying the four clutches and one way clutch in combinations of two produces five different ratios of a speed of the intermediate shaft to the speed of the input shaft, the five ratios including a negative value, zero, two values less than one, and one.

24. The transmission of claim 23 wherein the one way clutch is a one way brake.

25. The transmission of claim 23 wherein one of the six clutches selectively couples the same transmission elements that the one way clutch selectively couples.

26. The transmission of claim 23 wherein the ten ratios include nine positive ratios and one negative ratio.

* * * * *